United States Patent [19]

Sandfort et al.

[11] 3,922,652

[45] Nov. 25, 1975

[54] FIELD-ACCESSED MAGNETIC BUBBLE REPLICATOR

[75] Inventors: Robert Melvin Sandfort, St. Charles; Paul Townsend Bailey, Creve Coeur, both of Mo.

[73] Assignee: Monsanto Company, St. Louis, Mo.

[22] Filed: Mar. 22, 1974

[21] Appl. No.: 453,783

[52] U.S. Cl. ...................... 340/174 TF; 340/174 SR

[51] Int. Cl.[2] ...................... G11C 11/14; G11C 19/08

[58] Field of Search .................. 340/174 TF, 174 SR

[56] References Cited

UNITED STATES PATENTS

| | | | |
|---|---|---|---|
| 3,723,716 | 3/1973 | Bobeck et al. | 340/174 TF |
| 3,731,288 | 5/1973 | Marsh | 340/174 TF |
| 3,798,607 | 3/1974 | Minnick et al. | 340/174 TF |
| 3,810,133 | 5/1974 | Bobeck et al. | 340/174 TF |
| 3,832,701 | 8/1974 | Bobeck et al. | 340/174 TF |

*Primary Examiner*—Stanley M. Urynowicz, Jr.
*Attorney, Agent, or Firm*—Lane, Aitken, Dunner & Ziems

[57] ABSTRACT

A field-accessed chevron circuit for dividing a single bubble into two bubbles without the assistance of conductor current.

6 Claims, 2 Drawing Figures

FIELD-ACCESSED MAGNETIC BUBBLE REPLICATOR

BACKGROUND OF THE INVENTION

The invention relates generally to the field of magnetic bubble technology (MBT) and, more particularly, to bubble splitters, duplicators or replicators.

MBT involves the creation and manipulation of magnetic bubbles in specially prepared magnetic materials. The word "bubble," used throughout this text, is intended to encompass any single-walled magnetic domain, defined as a domain having an outer boundary which closes on itself. The application of a static, uniform magnetic bias field orthogonal to a sheet of magnetic material having suitable uniaxial anisotropy causes the normally random serpentine pattern of magnetic domains to shrink into isolated, short cylindrical configurations for bubbles whose common polarity is opposite that of the bias field. The bubbles repel each other and can be moved or propagated by a magnetic field in the plane of the sheet.

Many schemes exist for propagating bubbles along predetermined channels at a precisely determined rate so that uniform data streams of bubbles are possible in which the presence or absence of a bubble at a particular position within the stream indicates a binary 1 or 0. These techniques can be classed generally as conductor-accessed and field-accessed. In conductor-accessed propagation systems, electrically pulsed conductive loops are disposed in series over the magnetic sheet. In field-accessed propagation systems, electrical conductors are not disposed on a magnetic sheet for propagation; instead, an overlay pattern of ferromagnetic elements establishes a bubble propagation channel in which a sequence of attracting poles is caused to be formed in the presence of a continuous, uniformly rotating magnetic drive field in the plane of the sheet.

Bubble replication or duplication is used to form a replica or duplicate of a sequence or train of bubble bits. Bubble replication is useful in performing certain logic functions and in obtaining nondestructive readout. In the latter case, one bubble train is used for readout while its duplicate is recirculated in the bubble circuit.

Even in field-accessed bubble circuits, the most widely used replication schemes involve the use of a pulsed conductor loop to split a bubble in two. See, for example, Kurlansik et al, "Bubble Domain Constructions," *RCA Technical Note*, No. 885, June 4, 1971. The basic idea in current-assisted bubble splitters is to elongate the bubble and then to sever it into two bubbles by applying repulsive magnetic force to the middle of the elongated bubble. Conductor loops, however, are generally disadvantageous on field-accessed bubble chips because they entail more difficult fabrication techniques.

Field-accessed bubble splitters have been described before. An early form of field-accessed bubble doubler is shown in U.S. Pat. No. 3,713,118 to Danylchuk which describes a modification of a field-accessed bubble generator employing a revolving "seed" domain. Another field-accessed bubble splitter is shown in U.S. Pat. No. 3,701,125 to Chang et al and in Chang, "A Self-contained Magnet Bubble-domain Memory Chip," *IEEE Trans. Mag.*, Vol. MAG-8, No. 2, June 1972, pages 214–222. The bubble splitter utilizes a modified T-bar overlay circuit for stretching, pinching and splitting bubbles in two in one cycle of the rotating drive field.

SUMMARY OF THE INVENTION

The general purpose of the invention is to provide an improved field-accessed bubble splitter without conductor current assistance, especially adapted for compatible use with chevron circuits.

According to the invention, a multi-element chevron channel is divided into two diverging multi-element chevron channels by omission of a middle chevron element. An abrupt turn or corner is introduced into one of the diverging chevron channels. Bubbles propagating along the original multi-element channel are gradually forced to expand until they stretch between the two diverging channels. The stretched bubbles sever at the abrupt corner and the resulting separate bubbles continue propagating down the two bubble channels.

DESCRIPTION OF THE PREFERRED EMBODIMENT

Figures 1, 2:
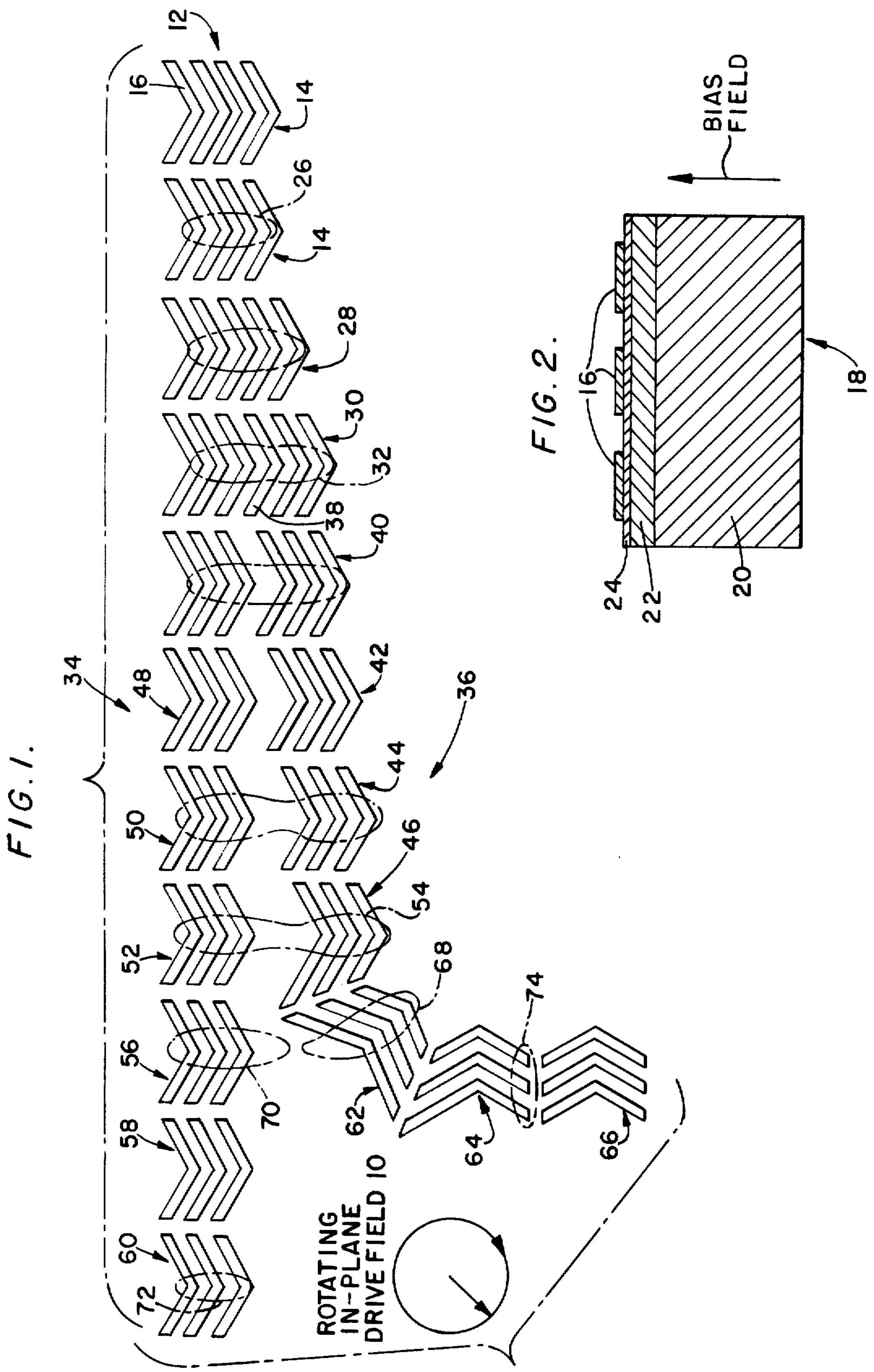
FIG. 1 is a schematic diagram illustrating a chevron overlay circuit pattern embodying the invention.
FIG. 2 is a sectional view of a bubble chip.

The chevron overlay circuit pattern in FIG. 1 propagates bubbles from the right to the left under the control of a uniformly rotating magnetic drive field 10 in the plane of the overlay pattern. The incoming bubble channel 12 is composed of stacks 14 of four parallel spaced chevron elements 16. The stacks 14 are arranged end-to-end in the conventional manner. The chevron elements 16 are each of conventional design, and form part of an otherwise conventional bubble chip 18 shown in FIG. 2. A substrate 20 of nonmagnetic garnet supports an epitaxial magnetic bubble layer 22 and a spacing layer 24 of silicon oxide to which permalloy chevron elements 16 are bonded. The chip is subjected to a static magnetic bias field orthogonal to the plane of the magnetic bubble garnet layer 22. In the presence of a bias field of suitable strength, cylindrical bubbles are maintained in garnet layer 22. The drive field 10 rotates in the plane of the garnet bubble layer 22 causing bubbles to propagate along the chevron channel 12 (FIG. 1) by producing consecutive, attracting magnetic poles in the chevron elements 16. Many parameters affect the performance of conventional chevron circuits, such as the number of parallel chevrons per bubble position (four chevrons being illustrated for stacks 14), the spacing of adjacent chevron elements, their width, the magnetic properties of the overlay material, the propagation rate and the strength of the bias and drive fields.

A bubble 26, shown in phantom in FIG. 1, is influenced magnetically by all of the chevrons in each stack 14. Thus, the bubble 26 assumes a somewhat elongated or oval shape coinciding approximately with the pattern of corresponding magnetic pulls formed in this instance at the vertex of each chevron element 16.

The first step in the bubble splitting operation is accomplished by consecutive multi-chevron stacks 28 and 30 which increase the number of parallel chevron elements per bubble position from four to five and six, respectively. This increase in the lateral width of the channel 12 causes a corresponding increase in the elongation of the bubble as shown for bubble 32 which has advanced to chevron stack 30. The next step in the splitting operation is to form two diverging channels 34 and 36 by omitting the middle element 38 in stack 30 from the next adjacent stack 40. Because of the close spacing of the diverging channels 34 and 36, the expanded bubble stretches to cover both channels 34 and 36. Successive chevron stacks 42, 44 and 46 in the lower channel 36 and corresponding stacks 48, 50 and 52 in the upper channel 34 become progressively more widely spaced. By the time a bubble 54 reaches corresponding stacks 46 and 52 in channels 36 and 34, the bubble 54 is stretched approximately to its limit. Successive stacks 56, 58 and 60 on the upper channel 34 are all approximately identical to stack 52 of the same channel. On the lower channel 36, however, the chevron stack following stack 46 is arranged at an abrupt angle so as to form a corner element 62 leading to downwardly propagating chevron stacks 64 and 66. The stretched bubble severs into two bubbles 68 and 70 as it encounters the corner element 62 on the lower track 36. The severed bubbles remain on the respective channels 34 and 36 as shown for bubbles 72 and 74 which have already been split.

The invention may be embodied in other specific forms without departing from its basic principle. For example, the invention is obviously applicable to any other field-accessed propagation system in which a plurality of similar bubble elements are used for each bubble position. In addition, the use of a uniformly rotating drive field is described here for illustration and the invention is equally applicable to other drive field systems, for example, sequentially pulsed discrete field orientations instead of uniform rotation. The present embodiment is therefore to be considered in all respects as illustrative and not restrictive, the scope of the invention being indicated by the claims rather than by the foregoing description, and all changes which come within the meaning and range of equivalents of the claims are therefore intended to be embraced therein.

We claim:

1. A field-accessed bubble splitting system, comprising a sheet of magnetic bubble material, means for producing and maintaining magnetic bubbles therein, means for generating a rotating magnetic drive field in the plane of said sheet, and a ferromagnetic circuit overlay pattern operatively disposed on said sheet defining an input channel and a pair of diverging channels defining consecutive bubbles positions through which bubbles are propagated by said drive field, said diverging channels being joined together to said input channel so as to gradually diverge therefrom, the angle of divergence of said diverging channels being sufficiently small to maintain a bubble propagated from said input channel stretched across said diverging channels for several consecutive bubble positions, one of said diverging channels having an abrupt turn away from the other of said diverging channels, the distance from the junction of said diverging channels with said input channel to the abrupt turn in said one diverging channel corresponding to several complete rotations of said drive field, said distance from said junction to said abrupt turn being predetermined such that by the time a stretched bubble arrives at said turn its limit of stretch has not yet been exceeded and it is thus severed at the turn into two bubbles which propagate on down said diverging channels respectively.

2. The splitting system of claim 1, wherein said input channel is composed of a plurality of similar circuit elements per bubble position and said diverging channels have at least one similar circuit element per bubble position, said circuit elements being magnetically responsive to said drive field for defining said bubble positions.

3. The splitting system of claim 2, wherein said diverging channels have a plurality of said similar circuit elements per bubble position fewer than the number of similar circuit elements per bubble position at said one end of said input channel.

4. The splitting system of claim 2, wherein said circuit elements are chevron-shaped.

5. The splitting system of claim 2, wherein the number of circuit elements in said diverging channels collectively at a point adjacent to said one end of said input channel being fewer than the number of circuit elements at said one end of said input channel.

6. The splitting system of claim 5, wherein said circuit elements are chevron-shaped.

* * * * *